(12) United States Patent
McHugh

(10) Patent No.: US 6,186,169 B1
(45) Date of Patent: Feb. 13, 2001

(54) VALVE AND ARRANGEMENT FOR FIRE SUPPRESSION SYSTEM

(75) Inventor: George J. McHugh, Broomall, PA (US)

(73) Assignee: AGF Manufacturing, Inc., Melvern, PA (US)

(*) Notice: Under 35 U.S.C. 154(b), the term of this patent shall be extended for 0 days.

(21) Appl. No.: 09/377,178

(22) Filed: Aug. 19, 1999

(51) Int. Cl.$^7$ .................................................. F16K 37/00
(52) U.S. Cl. .................. 137/559; 251/315.01; 251/206; 251/208; 251/359; 73/168
(58) Field of Search .................................. 137/559, 557; 251/315.01, 206, 207, 208, 359; 73/168

(56) References Cited

U.S. PATENT DOCUMENTS

| 350,510 | 10/1886 | Stretch . |
| 421,224 | 2/1890 | Applegarth . |

(List continued on next page.)

FOREIGN PATENT DOCUMENTS

| 963446 | 2/1975 | (CA) . |
| 42304 | 8/1908 | (CH) . |
| 110371 | 6/1925 | (CH) . |
| 181505 | 6/1922 | (GB) . |

OTHER PUBLICATIONS

Brochure from Triple "R" Specialty Co. dated Nov. 1986.
Brochure from Fire Sprinkler Fittings Co. dated Aug. 1986.
Brochure for Model 3011–BV Inspectors Test Ball Valve, AGF Mgf. Co., Inc.
Brochure from Victaulic dated Jun. 1986.
Brochure from Sunbelt Marketing, Inc. dated Apr. 15, 1986.
I–708–W Series 708–W Butterfly Valve with Weatherproof Actuator, Victaulic Company of America.
1000 Series Compact Flow Switch, KIP.
Standard for the Installation of Sprinkler Systems, NFPA 13, 1983 Ed., pp. 13–135.

Primary Examiner—Kevin Lee
(74) Attorney, Agent, or Firm—Burns, Doane, Swecker & Mathis, LLP

(57) ABSTRACT

A valve and valve arrangement for a fire suppression system includes a valve having an inlet and an outlet provided on opposite ends of the valve housing with a pressure relief valve in communication with the interior of the housing. A gap in a seat for the valve member provides communication with the inlet of the valve. In another embodiment, a valve has a disk provided in a passageway through the valve member to restrict the flow through the valve to a predetermined rate which is less than the fully opened flow rate through the valve.

45 Claims, 5 Drawing Sheets

U.S. PATENT DOCUMENTS

| | | |
|---|---|---|
| 899,201 | 9/1908 | Braybrook . |
| 926,774 | 7/1909 | Schmidt . |
| 1,017,292 | 2/1912 | Hyde . |
| 1,023,104 | 4/1912 | Carpenter . |
| 1,056,344 | 3/1913 | Lester . |
| 1,229,038 | 6/1917 | Cornelius . |
| 1,264,775 | 4/1918 | Coles . |
| 1,333,048 | 3/1920 | Webster . |
| 1,428,744 | 9/1922 | Bastian et al. . |
| 1,666,918 | 4/1928 | Scoville . |
| 1,757,237 | 5/1930 | Deutsch . |
| 1,808,092 | 6/1931 | Wimmer . |
| 1,825,512 | 9/1931 | Durham et al. . |
| 2,014,042 | 9/1935 | Fox . |
| 2,108,272 | 2/1938 | Seyfarth . |
| 2,140,292 | 12/1938 | Jensen . |
| 2,209,397 | 7/1940 | Gannestad . |
| 2,347,830 | 5/1944 | Kiburz et al. . |
| 2,491,361 | 12/1949 | Burdick . |
| 2,621,012 | 12/1952 | Graham . |
| 2,660,560 | 11/1953 | Pickard . |
| 2,859,611 | 11/1958 | Morse . |
| 3,016,062 | 1/1962 | Zinniger . |
| 3,021,869 | 2/1962 | Ross . |
| 3,052,445 | 9/1962 | Kessler . |
| 3,072,059 | 1/1963 | Heffel . |
| 3,131,716 | 5/1964 | Griswold et al. . |
| 3,134,405 | 5/1964 | White et al. . |
| 3,139,907 | 7/1964 | Jones . |
| 3,148,254 | 9/1964 | Clason . |
| 3,148,695 | 9/1964 | Groen, Jr. et al. . |
| 3,228,652 | 1/1966 | Antrim . |
| 3,233,865 | 2/1966 | Panzica et al. . |
| 3,251,419 | 5/1966 | Howard . |
| 3,273,595 | 9/1966 | Novak . |
| 3,308,850 | 3/1967 | Gill . |
| 3,314,643 | 4/1967 | Sachnik . |
| 3,344,247 | 9/1967 | Kmiecik . |
| 3,344,808 | 10/1967 | Cary . |
| 3,345,032 | 10/1967 | Rawstron . |
| 3,347,516 | 10/1967 | Linde . |
| 3,352,155 | 11/1967 | Penet . |
| 3,354,716 | 11/1967 | Wiebe et al. . |
| 3,360,621 | 12/1967 | Liddell . |
| 3,379,410 | 4/1968 | Stewart, Jr. . |
| 3,385,318 | 5/1968 | Kilbourn . |
| 3,386,461 | 6/1968 | Fisher . |
| 3,517,554 | 6/1970 | Smith . |
| 3,525,363 | 8/1970 | Gore et al. . |
| 3,526,249 | 9/1970 | Buastian . |
| 3,567,176 | 3/1971 | Johnson . |
| 3,604,631 | 9/1971 | Etter . |
| 3,674,238 | 7/1972 | Pickles et al. . |
| 3,817,097 | 6/1974 | Heroux . |
| 3,851,665 | 12/1974 | Coughlin . |
| 3,854,497 | 12/1974 | Rosenberg . |
| 3,860,032 | 1/1975 | Rogers . |
| 3,939,871 | 2/1976 | Dickson . |
| 3,986,397 | 10/1976 | Perreault . |
| 4,041,891 | 8/1977 | Rosaen . |
| 4,108,207 | 8/1978 | Doody . |
| 4,130,128 | 12/1978 | Kaneko . |
| 4,143,255 | 3/1979 | Herscovitz . |
| 4,177,832 | 12/1979 | Price . |
| 4,187,872 | 2/1980 | Freeman et al. . |
| 4,208,033 | 6/1980 | Kesterman . |
| 4,230,154 | 10/1980 | Kalbfleish . |
| 4,244,393 | 1/1981 | Lehtinen . |
| 4,273,152 | 6/1981 | Freeman . |
| 4,399,977 | 8/1983 | Wheatley . |
| 4,530,375 | 7/1985 | Bey . |
| 4,575,262 | 3/1986 | Andersen . |
| 4,643,224 | 2/1987 | Rung ................................... 137/559 |
| 4,655,078 | 4/1987 | Johnson . |
| 4,657,222 | 4/1987 | Tullio . |
| 4,662,394 | 5/1987 | Williams . |
| 4,704,983 | 11/1987 | Rung ................................... 137/559 |
| 4,729,403 | 3/1988 | Roche ................................. 137/559 |
| 4,739,794 | 4/1988 | Ballun ................................. 137/599 |
| 4,741,361 | 5/1988 | McHugh . |
| 4,782,333 | 11/1988 | Merchant . |
| 4,796,858 | 1/1989 | Kabel . |
| 4,848,401 | 7/1989 | Devilleger et al. . |
| 4,852,610 | 8/1989 | McHugh . |
| 4,971,109 | 11/1990 | McHugh . |
| 4,993,453 | 2/1991 | McHugh . |
| 4,995,423 | 2/1991 | McHugh . |
| 5,018,386 * | 5/1991 | Zeoli ..................................... 73/168 |
| 5,103,362 | 4/1992 | McHugh . |
| 5,269,344 | 12/1993 | McHugh . |
| 5,406,979 | 4/1995 | McHugh .............................. 137/557 |
| 5,588,462 | 12/1996 | McHugh .............................. 137/557 |
| 5,944,051 * | 8/1999 | Johnson ............................... 137/559 |

* cited by examiner

VALVE AND ARRANGEMENT FOR FIRE SUPPRESSION SYSTEM

BACKGROUND AND SUMMARY OF THE PRESENT INVENTION

The present invention relates generally to valves and more particularly relates to valve arrangements for use in testing fire suppression water sprinkler systems.

In a typical fire suppression water sprinkler system as installed in many buildings, an array of individual water sprinklers is supplied with water through a main conduit and various branch conduits. The individual water sprinklers are generally provided with a member that melts when the ambient temperature reaches a predetermined level indicative of a fire. The melting of the member opens a water sprinkler to spray water in order to suppress the fire. The individual water sprinklers are provided with meltable members so that the spray of water will hopefully be limited to the region of the building where the fire is present. In this way, the extent of water damage may be minimized.

Such fire suppression systems also oftentimes have a switch or sensor that detects the flow of water in the conduits to indicate that even only one of the individual water sprinklers has opened. Since the flow of water in the conduits generally means that a fire is present in the building, the switch or sensor typically triggers a fire alarm or sends an appropriate signal directly to a fire department. Therefore, many codes require, and it is generally otherwise desirable, that the switch or sensor which detects the flow of water in the conduits be periodically tested. Accordingly, it has also become conventional in the art to provide a valve which enables the system to be tested by permitting a flow of water corresponding to the flow through only one individual water sprinkler that has been opened.

Various valves and arrangements for testing and also for draining fire suppression systems are known in the art such as are shown and described in U.S. Pat. Nos. 5,103,862, 4,971,109, 4,995,423, 4,852,610, 4,741,361 all of AGF Manufacturing, Inc. These patents are each incorporated herein by reference.

It is increasingly desirable to provide a pressure relief feature for a fire suppression system with a separate pressure relief valve typically provided for each floor or for each different group of water sprinklers.

In view of the above background information, it is an object of the present invention to provide a testing valve and testing valve arrangement by which a fire suppression system may be tested.

A further object of the present invention is to provide a testing valve and testing valve arrangement by which a fire suppression system may be provided with a pressure relief function economically and efficiently.

It is another object of the present invention to provide a testing valve and testing valve arrangement for a fire suppression system which is economical and easy to operate.

Another object of the present invention is to provide a valve in which flow corresponding to a preselected flow rate may be obtained easily and economically.

An additional object of the present invention is to provide a testing valve and testing valve arrangement by which a fire suppression system may be tested with the flow through the valve restricted to correspond to the flow through a single sprinkler head.

The above objects as well as other objects not specifically mentioned are accomplished by a valve arrangement in accordance with the present invention for testing and draining a fire suppression sprinkler system in which a conduit supplies a fire suppression fluid to a plurality of sprinklers with a flow through the conduit being sensed. A valve has a housing with an inlet and a first outlet provided on opposite ends of the housing with a ball valve member being provided in the housing between the inlet and the first outlet. A valve seal is provided between the ball valve member and said first outlet for sealingly engaging the outer surface of said ball valve member. A valve seat is provided between the ball valve member and the inlet to permit continuous communication between the inlet and the interior of the housing. A pressure relief valve has an inlet in communication with the interior of said housing. The ball valve member has a first passageway which permits flow from the inlet to the first outlet at a first flow rate when the first passageway is aligned with the inlet and the first outlet, with the first flow rate enabling the arrangement to be drained. The ball valve member has a second passageway which permits flow from the inlet to the first outlet at a second flow rate which is less than the first flow rate when the second passageway is aligned with the inlet and the first outlet. The second flow rate enables the means for sensing a flow of said fire suppression fluid in said conduit means to be tested. Means are also provided for moving the ball valve member within the housing.

In the preferred embodiment, the valve seat is provided with a gap to provide the communication between the inlet and the interior of the housing. In addition, in the preferred embodiment, the second flow rate corresponds to the flow rate through a single open water sprinkler head.

A valve, according to the present invention, comprises a housing having an inlet and a first outlet being provided on opposite ends of the housing with a valve member being provided in the housing between the inlet and the first outlet. A valve seal is provided between the valve member and said first outlet for sealingly engaging the outer surface of said valve member. A valve seat is provided between the valve member and the inlet to permit continuous communication between the inlet and the interior of the housing. A pressure relief valve has an inlet in communication with the interior of said housing. The valve member has a first passageway which permits flow from the inlet to the first outlet at a first flow rate when the first passageway is aligned with the inlet and the first outlet. The valve member has a second passageway which permits flow from the inlet to the first outlet at a second flow rate which is less than the first flow rate when the second passageway is aligned with the inlet and the first outlet. The valve also includes means for moving said valve member within the housing.

In the preferred embodiment of the arrangement for testing and draining a fire suppression sprinkler system, the valve has valve actuator means for arranging said valve member (1) to prevent flow between said inlet and said first outlet, (2) to permit a flow from the inlet to the first outlet at a first flow rate for draining said arrangement, and (3) to permit a flow rate from the inlet to the first outlet at a second flow rate which is less than the first flow rate. The second flow rate enables the means for sensing a flow of said fire suppression fluid in said conduit means to be tested. In addition, in the preferred embodiment, the valve member is a ball which includes a first passageway through the ball which permits said flow at said first flow rate when said first passageway is aligned with said inlet and said first outlet.

The ball may include a second passageway through said ball which permits said flow at said second flow rate when said second passageway is aligned with said inlet and said first outlet. In another preferred embodiment, the ball includes a disk provided within the first passageway having an opening which permits a flow corresponding to the second flow rate. The disk is movable between a first position in which said disk is aligned with said first passageway and a second position in which said disk blocks said first passageway except for said opening.

Another valve according to the present invention comprises a housing having an inlet and an outlet, with the inlet and the outlet being provided on opposite ends of the housing with a valve member being provided in the housing between the inlet and the outlet. Valve actuator means are provided for arranging said valve member (1) to prevent flow between said inlet and said first outlet, (2) to permit a flow from the inlet to the first outlet at a first flow rate, and (3) to permit a flow rate from the inlet to the first outlet at a second flow rate which is less than the first flow rate. The valve member includes a first passageway through said valve member which permits said flow at said first flow rate when said first passageway is aligned with said inlet and said outlet. The valve member also includes a disk provided within the first passageway with the disk comprising second passageway means for permitting a flow corresponding to the second flow rate.

In the preferred embodiment, the valve member is a ball with the disk being movable between a first position in which said disk is aligned with said first passageway and a second position in which said disk blocks said flow through said first passageway except through said second passageway means.

BRIEF DESCRIPTION OF THE DRAWINGS

The preferred embodiments of the present invention will be described in greater detail with reference to the accompanying drawings, wherein like members bear like reference numerals and wherein.

DETAILED DESCRIPTION OF THE PREFERRED EMBODIMENTS

Figure 1:
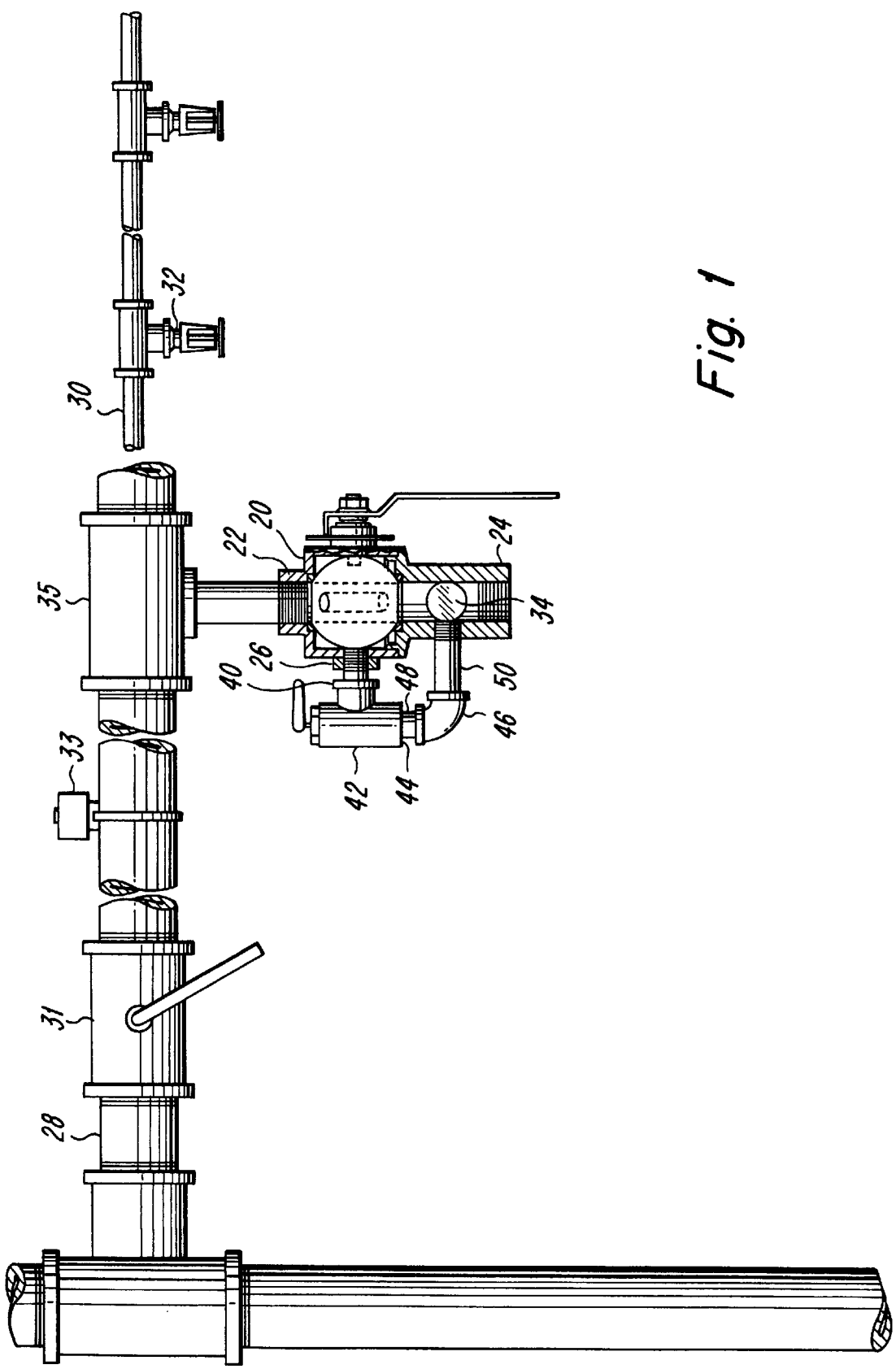
FIG. 1 is a side view of a valve arrangement according to the present invention.

With reference to FIG. 1, a preferred embodiment of an arrangement for testing a fire suppression water sprinkler system includes a valve 20 having a housing defining an inlet 22 and a first outlet 24. The inlet 22 and the first outlet 24 are colinear with one another.

The inlet 22 of the valve 20 is provided in fluid communication with a main water conduit 28 having a plurality of branch conduits 30 including a number of sprinkler heads 32. Typically, a supply valve 31 either for the entire fire suppression system or for a particular floor or for a portion of the system, is provided in the main water conduit 28 upstream of the valve 20. Downstream of the supply valve 31 is a flow switch 33 which is configured to detect a flow through the conduit 28 corresponding at least to the flow through a single sprinkler head 32.

The valve 20 is connected to the conduit 28 through a T-fitting 35 which supplies fluid to the inlet 22 of the valve 20. The valve 20 also includes a pair of sight glasses 34 in the first outlet 24 in order to permit a visual observation of a flow through the first outlet 24.

The housing for the valve 20 also includes a second outlet 26 which is connected to an inlet 40 of a pressure relief valve 42. An outlet 44 of the pressure relief valve 42 is connected through an elbow 46 and nipples 48, 50 to the first outlet 24. Preferably, the outlet 44 of the pressure relief valve 42 is piped to the first outlet 24 of the valve 20 such as through an additional tapping provided adjacent the sight glasses 34. In this way, a pressure relief function would be provided for the fire suppression system. Of course, the pressure relief valve 42 could be connected to the second outlet 26 and the first outlet 24 through other suitable, conventional arrangements such as through flexible tubing (not shown).

Figure 2:
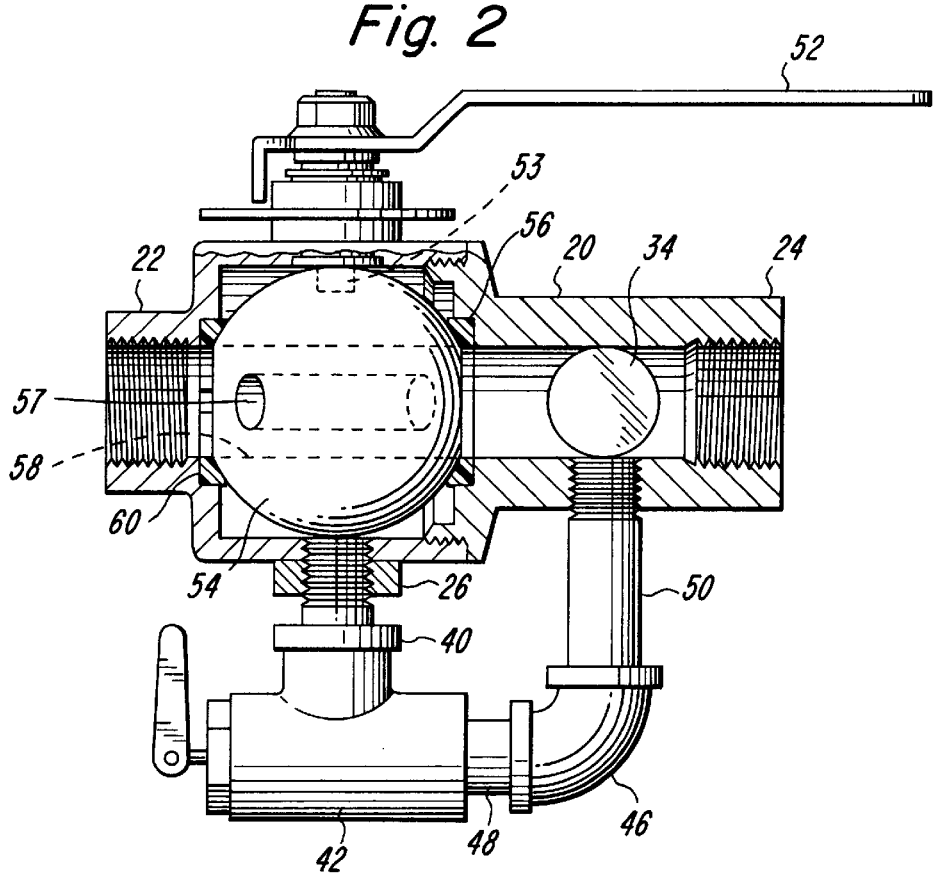
FIG. 2 is a side view in cross section of the testing valve of FIG. 1.

With reference now to FIG. 2, the valve 20 includes a valve handle 52 which is movable between a first "off" position in which fluid communication between the inlet 22 and the first outlet 24 is prevented by a valve member 54. The valve handle 52 is connected to a shaft 53 which engages a slot in the valve member 54 to rotate the valve member 54 with the valve handle 52. The valve member is preferably ball shaped with the valve 20 comprising a ball valve. When the valve handle 52 is in the "off" position, a solid portion of the valve member 54 meets a valve seal 56 provided within the valve housing downstream of the valve member 54. The valve member 54 has two passageways provided through the valve member 54. The first passageway 57 has a cross-sectional opening which permits a flow corresponding to the flow through a single sprinkler head of the fire suppression system. The second passageway 58 has a cross-sectional opening corresponding to the unrestricted flow through the inlet 22 and the first outlet 24 of the valve. The valve housing also includes the valve seat 60 provided within the inlet of the valve adjacent to the valve member 54.

The valve member 54 and the valve correspond generally to the sprinkler drain and test valve disclosed in U.S. Pat. No. 4,655,078 which is incorporated herein by reference.

When the handle 52 is in the "drain" position (as shown in FIG. 2) the second passageway 58 is aligned with the valve inlet 22 and the first outlet 24 so as to provide an unrestricted flow through the valve. When the handle 52 is in the "test" position, the passageway 57 is aligned with the valve inlet 22 and the first outlet 24 permitting a flow through the first outlet corresponding to the flow through a single water sprinkler head.

Figure 3:
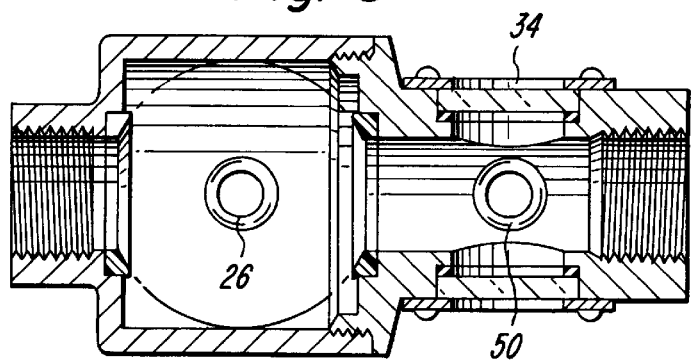
FIG. 3 is a top view in cross section of the valve of FIG. 2.
Figure 4:
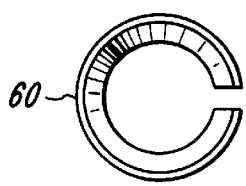
FIG. 4 is a side view of a valve seat of the valve of FIG. 2.
Figure 5:
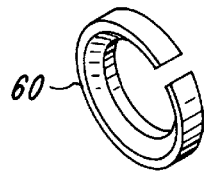
FIG. 5 is a pictorial view of the valve seat of FIG. 4.

With reference to FIG. 3, however, the valve seat 60 is split (see also FIGS. 4 and 5) so that the valve seat 60 does not provide a sealing contact with the valve member 54 even when the valve handle 52 is in the "off" position. Instead, flow is permitted to occur from the inlet 22 through the split in the seal 60 into the interior of the valve housing and into the second outlet 26.

In this way, the second outlet 26 and therefore, the inlet to the pressure relief valve 42, is always in communication with the inlet of the valve 20 to provide a pressure relief feature for the system.

With reference to FIG. 3, the pair of sight glasses 34 are preferably located 180 degrees apart from one another and 90 degrees apart from the port for the nipple 50 from the outlet of the pressure relief valve. In FIG. 3, the valve member 54 is shown in phantom to show the second outlet 26 of the valve. In addition, the gap in the seat 60 may be positioned anywhere about the seat and need not be positioned as indicated in FIG. 3.

In operation, when the valve handle 52 is in the "off" configuration, flow is blocked from the inlet 22 to the first outlet 24. Flow is permitted from the inlet 22 to the second outlet 26 to the pressure relief valve 42 through the gap in the valve seat 60. However, unless the pressure in the inlet exceeds the pressure needed to open the pressure relief valve 42, no flow will occur through the pressure relief valve 42. When the valve handle 52 is moved to the test position, flow from the inlet to the first outlet 24 will be permitted through the passageway 57 corresponding to the flow through a single open water sprinkler head. In this way, the flow switch 33 may be tested. When desired, the handle 52 may be moved to the "drain" position to permit a fully unrestricted flow through the valve from the inlet to the first outlet 24.

Figure 6:
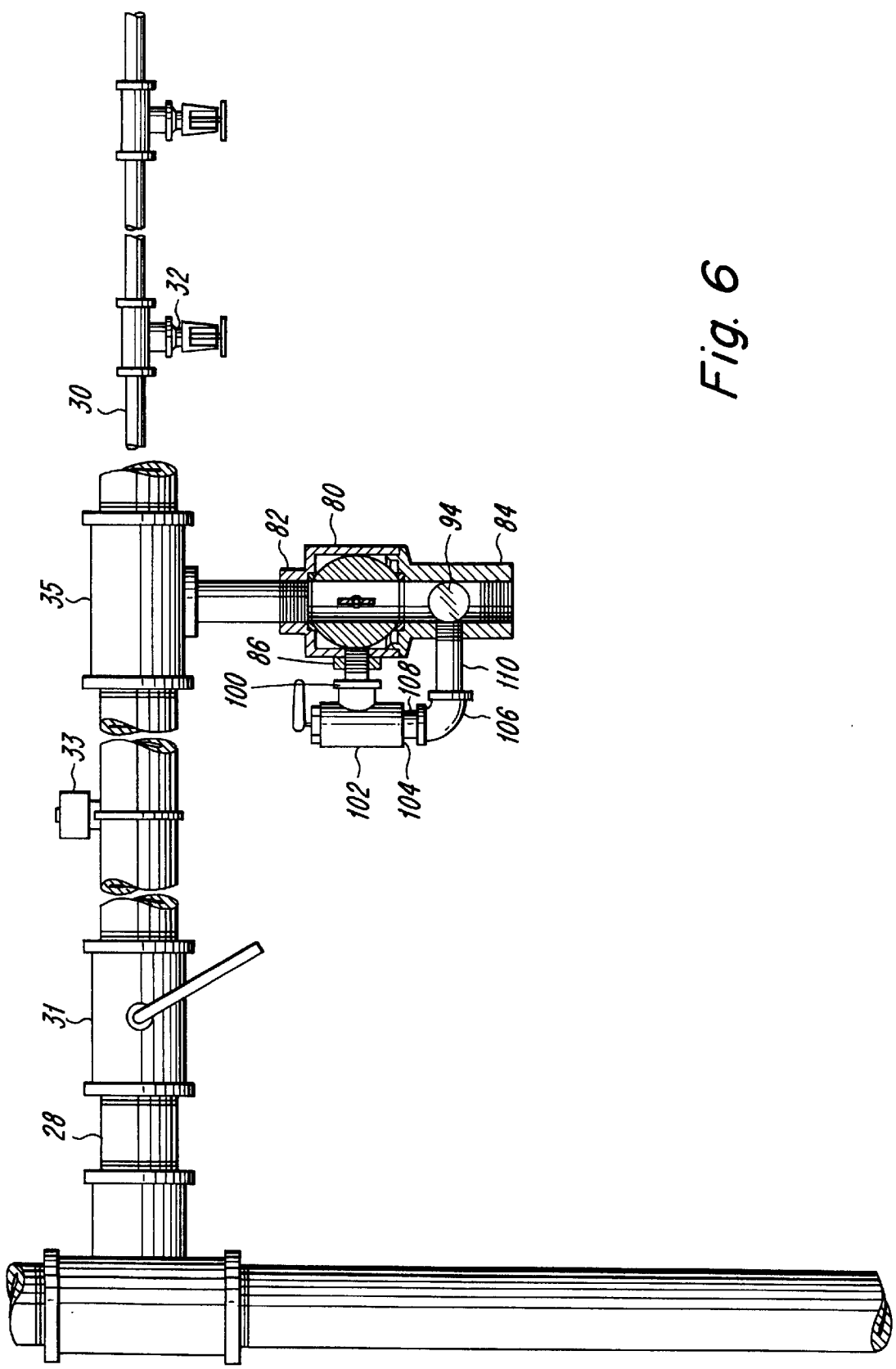
FIG. 6 is a side view of another valve arrangement according to the present invention.

With reference now to FIG. 6, another preferred embodiment of an arrangement for testing a fire suppression water sprinkler system includes a valve 80 having a housing defining an inlet 82 and a first outlet 84. The inlet 82 and the first outlet 84 are colinear with one another.

The inlet 82 of the valve 80 is provided in fluid communication with a main water conduit 28 having a plurality of branch conduits 30 including a number of sprinkler heads 32. Typically, a supply valve 31 either for the entire fire suppression system or for a particular floor or for a portion of the system, is provided in the main water conduit 28 upstream of the valve 20. Downstream of the supply valve 31 is a flow switch 33 which is configured to detect a flow through the conduit 28 corresponding at least to the flow through a single sprinkler head 32.

The valve 80 is connected to the conduit 28 through a T-fitting 35 which supplies fluid to the inlet 82 of the valve 80. The valve 80 also includes a pair of sight glasses 94 in the first outlet 84 in order to permit a visual observation of a flow through the first outlet 84.

The housing for the valve 80 also includes a second outlet 86 which is connected to an inlet 100 of a pressure relief valve 102. An outlet 104 of the pressure relief valve 102 is connected through an elbow 106 and nipples 108, 110 to the first outlet 84. Preferably, the outlet 104 of the pressure relief valve 102 is piped to the first outlet 84 of the valve 80 such as through an additional tapping provided adjacent the sight glasses 94. In this way, a pressure relief function would be provided for the fire suppression system. Of course, the pressure relief valve 102 could be connected to the second outlet 86 and the first outlet 84 through other suitable, conventional arrangements such as through flexible tubing (not shown).

Figure 7:
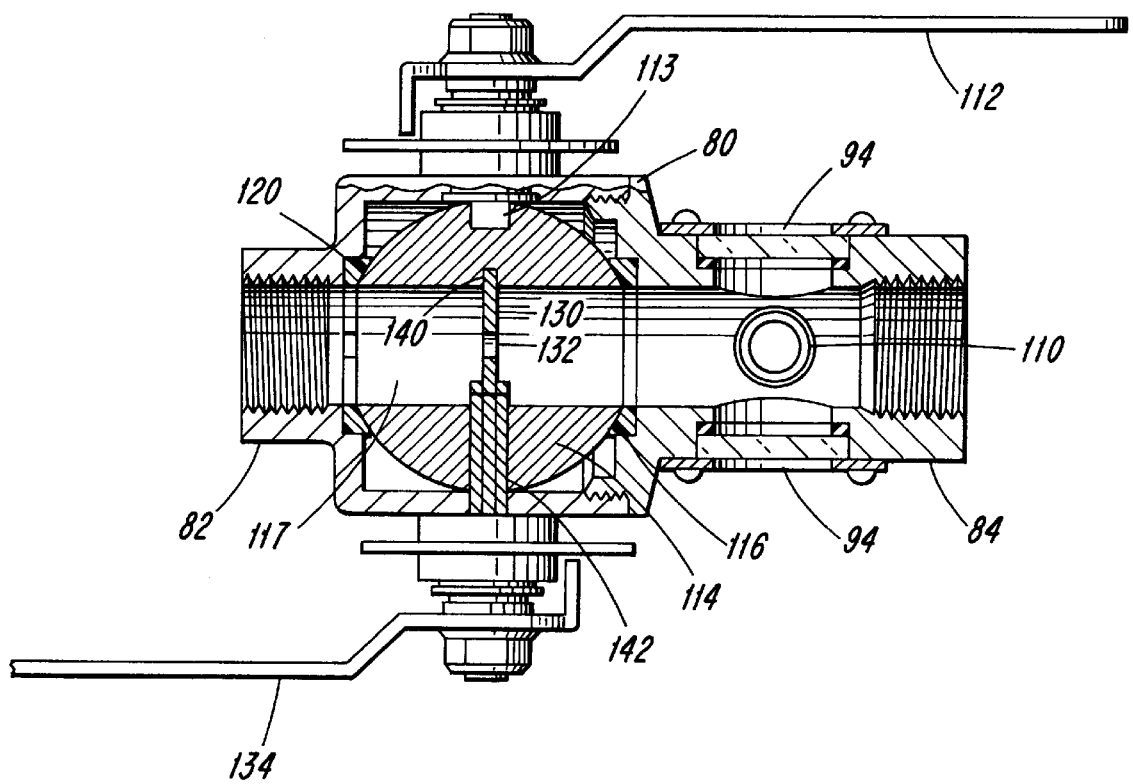
FIG. 7 is a side view in cross section of the testing valve of the arrangement of FIG. 6.

With reference now to FIG. 7, the valve 80 includes a valve handle 112 which is movable between a first "off" position in which fluid communication between the inlet 82 and the first outlet 84 is prevented by a valve member 114. The valve handle 112 is connected to a shaft 113 which engages a slot in the valve member 114 to rotate the valve member 114 with the valve handle 112. The valve member is preferably ball shaped with the valve 80 comprising a ball valve. When the valve handle 112 is in the "off" position, a solid portion of the valve member 114 meets a valve seal 116 provided within the valve housing downstream of the valve member 114. The valve member 114 has only one passageway 118 provided through the valve member 114. The passageway 118 has a cross-sectional opening which permits an unrestricted flow from the inlet 82 to the first outlet 84 of the valve. The valve housing also includes the valve seat 120 provided within the inlet of the valve adjacent to the valve member 114.

When the handle 112 is in the "drain" position (as shown in FIG. 7) the passageway 117 is aligned with the valve inlet 82 and the first outlet 84 so as to provide an unrestricted flow through the valve.

In order to permit a testing feature for the valve, a disk or butterfly valve member 130 is provided inside the passageway 117. The disk 130 is provided with an opening or passageway 132 which permits a flow through the disk 130 corresponding to the flow through a single sprinkler head. The disk 130 is mounted for rotation in the valve member 114 about an axis of rotation extending through the center of the valve member 114 and coincident with the axis of rotation of the valve member 114.

The disk 130 is rotated by a second valve actuator or handle 134 which is provided opposite to the first valve handle 112. When the second handle 134 is in the "test" position, the disk 130 is oriented perpendicular to the passageway 117 so as to block a flow through the passageway 117 except through the opening 132. In this way, flow from the inlet 82 through the first outlet 84 is restricted to correspond to the flow through a single water sprinkler head.

Figure 8:
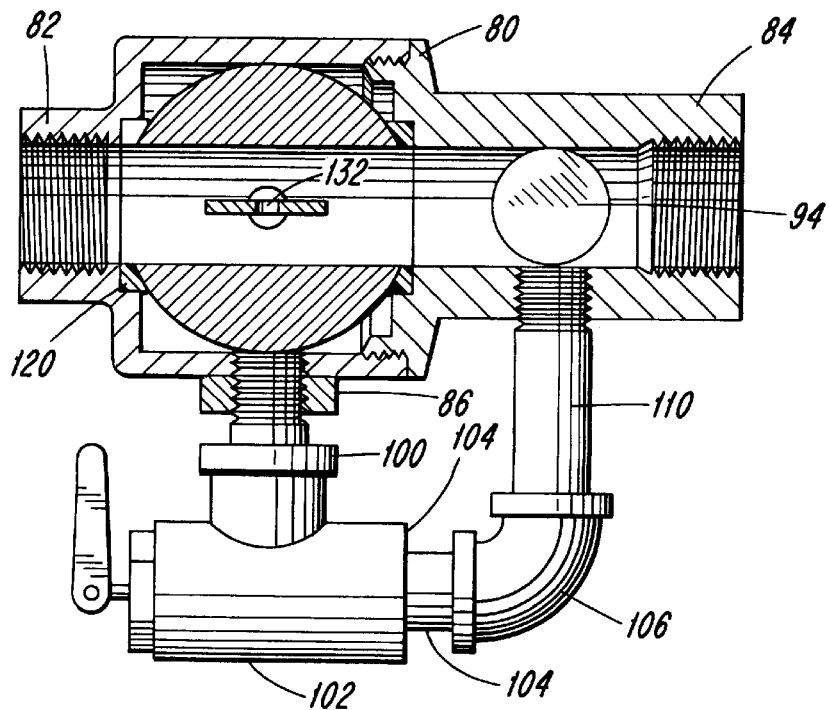
FIG. 8 is a top view in cross section of the testing valve of FIG. 7.

The second handle 134 may also be moved to a "drain" position in which the disk 130 is aligned with the passageway 117 so as to not restrict flow through the passageway 117 (see FIG. 8).

The positioning and actuation of a butterfly valve or disk within a ball valve is disclosed generally in U.S. Pat. No. 3,860,032 and the positioning and actuation of a butterfly valve or disk within a plug valve is disclosed generally in U.S. Pat. No. 2,209,397 both of which are incorporated herein by reference.

As desired, the disk 130 may be provided with a projection 140 which is received within a hole provided in the valve member 114 to provide the axis of rotation for the disk 130. Similarly, the disk 30 may be received within a slot provided in a shaft 142 which is connected to the second handle 134 to rotate the disk along with rotation of the handle 134. A pin or other arrangement may be used to attach the disk to the shaft 142.

With reference now to FIG. 8, if the valve 80 is provided with the pressure relief valve 102, the valve seat 120 is split (similarly to that shown in FIGS. 4 and 5) so that the valve seat 120 does not provide a sealing contact with the valve member 114 even when the first valve handle 112 is in the "off" position. Instead, flow is permitted to occur from the inlet 82 through the split in the seat 120 into the interior of the valve housing and into the second outlet 86.

In this way, the second outlet 86 and therefore, the inlet to the pressure relief valve 102, is always in communication with the inlet of the valve 80 to provide a pressure relief feature for the system.

With reference again to FIG. 7, the pair of sight glasses 94 are preferably located 180 degrees apart from one another and 90 degrees apart from the port for the nipple 110 from the outlet of the pressure relief valve.

With reference to FIG. 8, the gap in the seat 120 may be positioned anywhere about the seat and need not be positioned as indicated in FIG. 8.

In operation, when the first valve handle 112 is in the "off" configuration, flow is blocked from the inlet 82 to the first outlet 84. Flow is permitted from the inlet 82 to the second outlet 86 to the pressure relief valve 102 through the gap in the valve seat 120. However, unless the pressure in the inlet exceeds the pressure needed to open the pressure relief valve 102, no flow will occur through the pressure relief valve 102. When the first valve handle 112 is moved to the drain position, and the second handle 134 is in the test position, flow from the inlet to the first outlet 84 will be permitted through the passageway 117 (and through the opening 132 in the disk 130) corresponding to the flow through a single open water sprinkler head. In this way, the flow switch 33 may be tested. When desired, the second handle 134 may be moved to the "drain" position to permit a fully unrestricted flow through the valve from the inlet to the first outlet 84.

Figure 9:
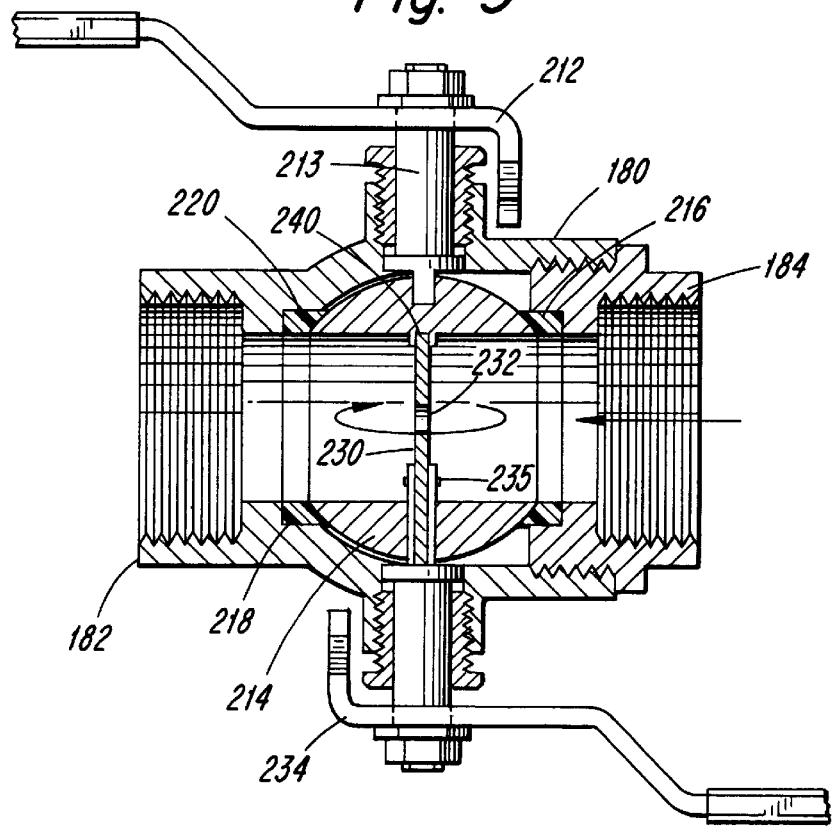
FIG. 9 is a side view in cross section of another valve according to the present invention; and, FIG. 10 is an end view of the valve of FIG. 9.
Figure 10:
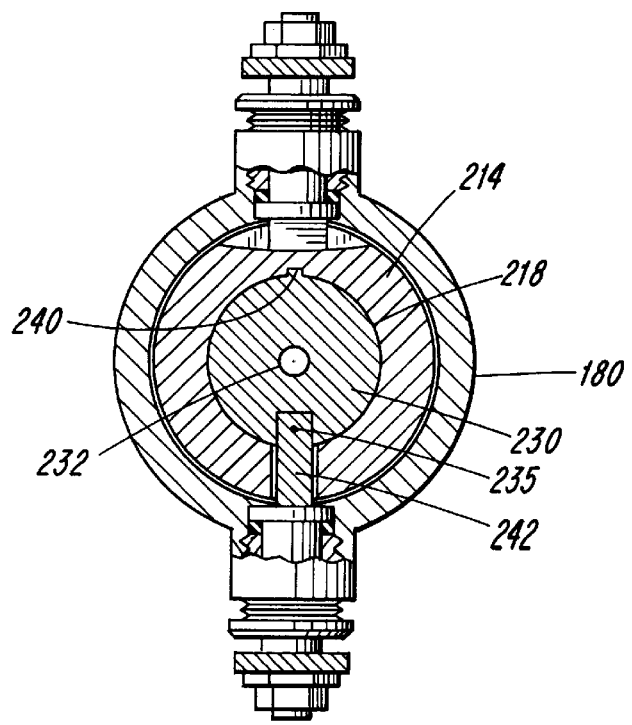

With reference now to FIG. 9, another valve according to the present invention includes a valve 180 having a housing defining an inlet 182 and an outlet 184. The inlet 182 and the first outlet 184 are colinear with one another. The valve 180 includes a first valve handle 212 which is movable between a first "off" position in which fluid communication between the inlet 182 and the outlet 84 is prevented by a valve member 214. The valve handle 212 is connected to a shaft 213 which engages a slot in the valve member 214 to rotate the valve member 214 with the valve handle 212. The valve member is preferably ball shaped with the valve 180 comprising a ball valve. When the first valve handle 212 is in the "off" position, a solid portion of the valve member 214 meets a valve seal 216 provided within the valve housing downstream of the valve member 214. The valve member 214 has only one passageway 218 provided through the valve member 214. The passageway 218 has a cross-sectional opening which permits an unrestricted flow from the inlet 182 to the outlet 184 of the valve. The valve housing also includes the valve seat 220 provided within the inlet of the valve adjacent to the valve member 214.

When the first handle 212 is in the "drain" position (as shown in FIG. 9) the passageway 218 is aligned with the valve inlet 182 and the outlet 184 so as to provide an unrestricted flow through the valve.

In order to permit a flow through the valve at a predetermined flow rate which is less than the unrestricted flow rate, a disk or butterfly valve member 230 is provided inside the passageway 218. The disk 230 is provided with an opening or passageway 232 which permits a flow through the disk 230 corresponding to the flow through a single sprinkler head. The disk 230 is mounted for rotation in the valve member 214 about an axis of rotation extending through the center of the valve member 214 and coincident with the axis of rotation of the valve member 214.

The disk 230 is rotated by a second valve actuator or handle 234 which is provided opposite to the first valve handle 212. The second handle 234 may be moved so as to orient the disk 230 perpendicular to the passageway 217 so as to block a flow through the passageway 218 except through the opening 232. In this way, flow from the inlet 182 through the outlet 184 is restricted to correspond to a predetermined flow which is less than the unrestricted flow through the valve.

The second handle 234 may also be moved to a "drain" position in which the disk 230 is aligned with the passageway 217 so as to not restrict flow through the passageway 217.

As desired, the disk 230 may be provided with a projection 240 which is received within a hole provided in the valve member 214 to provide the axis of rotation for the disk 230. Similarly, the disk 230 may be received within a slot provided in a shaft 242 which is connected to the second handle 234 to rotate the disk along with rotation of the handle 234. A pin 235 or other arrangement may be used to attach the disk to the shaft 242.

In operation, when the first valve handle 212 is in the "off" configuration, flow is blocked from the inlet 182 to the outlet 184. When the first valve handle 212 is moved to the drain position, and the second handle 234 is positioned to place the disk 230 across the passageway 218, flow from the inlet 182 to the outlet 184 will be permitted through the passageway 218 (and through the opening 232 in the disk 230) corresponding to a predetermined flow. When desired, the second handle 234 may be moved to the "drain" position to permit a fully unrestricted flow through the valve from the inlet 182 to the outlet 184.

The principles, preferred embodiments and mode of operation of the present invention have been described in the foregoing specification. However, the invention which is intended to be protected is not to be construed as limited to the particular embodiments disclosed. The embodiments are therefore to be regarded as illustrative rather than as restrictive. Variations and changes may be made without departing from the spirit of the present invention. Accordingly, it is expressly intended that all such equivalents, variations and changes which fall within the spirit and scope of the present invention as defined in the claims be embraced thereby.

What is claimed is:

1. An arrangement for testing and draining a fire suppression sprinkler system, comprising:

conduit means for supplying a fire suppression fluid to a plurality of sprinklers;

means for sensing a flow of said fire suppression fluid in said conduit means;

a valve having a housing with an inlet and a first outlet, the inlet and the first outlet being provided on opposite ends of the housing with a ball valve member being provided in the housing between the inlet and the first outlet;

a valve seal provided between the ball valve member and said first outlet for sealingly engaging the outer surface of said ball valve member;

a valve seat provided between the ball valve member and the inlet, said valve seat permitting continuous communication between the inlet and the interior of the housing;

a pressure relief valve having an inlet in communication with the interior of said housing;

said ball valve member having a first passageway which permits flow from the inlet to the first outlet at a first flow rate when the first passageway is aligned with the inlet and the first outlet, said first flow rate enabling said arrangement to be drained, said ball valve member having a second passageway which permits flow from the inlet to the first outlet at a second flow rate which is less than the first flow rate when the second passageway is aligned with the inlet and the first outlet, said second flow rate enabling the means for sensing a flow of said fire suppression fluid in said conduit means to be tested; and, means for moving said ball valve member within said housing.

2. The arrangement of claim 1, wherein said valve seat is provided with a gap to provide said communication between the inlet and the interior of the housing.

3. The arrangement of claim 1, wherein said pressure relief valve has an outlet in communication with said first outlet of said valve.

4. The arrangement of claim 1, further comprising at least one sight glass provided in said first outlet.

5. The arrangement of claim 1, wherein said second flow rate corresponds to the flow rate through a single open water sprinkler head.

6. A valve for use in a fire suppression sprinkler system, said valve comprising:
   a housing having an inlet and a first outlet, the inlet and the first outlet being provided on opposite ends of the housing with a valve member being provided in the housing between the inlet and the first outlet;
   a valve seal provided between the valve member and said first outlet for sealingly engaging the outer surface of said valve member;
   a valve seat provided between the valve member and the inlet, said valve seat permitting continuous communication between the inlet and the interior of the housing;
   a pressure relief valve having an inlet in communication with the interior of said housing;
   said valve member having a first passageway which permits flow from the inlet to the first outlet at a first flow rate when the first passageway is aligned with the inlet and the first outlet, said valve member having a second passageway which permits flow from the inlet to the first outlet at a second flow rate which is less than the first flow rate when the second passageway is aligned with the inlet and the first outlet; and,
   means for moving said valve member within said housing.

7. The valve of claim 6, wherein said valve seat is provided with a gap to provide said communication between the inlet and the interior of the housing.

8. The valve of claim 6, wherein said pressure relief valve has an outlet in communication with said first outlet of said valve.

9. The valve of claim 6, further comprising at least one sight glass provided in said first outlet.

10. The valve of claim 6, wherein said second flow rate corresponds to the flow rate through a single open water sprinkler head.

11. The valve of claim 6 wherein said valve member is a ball.

12. The valve of claim 11, wherein said valve seat is provided with a gap to provide said communication between the inlet and the interior of the housing.

13. The valve of claim 12, wherein said pressure relief valve has an outlet in communication with said first outlet of said valve.

14. The valve of claim 13, further comprising at least one sight glass provided in said first outlet.

15. The valve of claim 13, wherein said second flow rate corresponds to the flow rate through a single open water sprinkler head.

16. An arrangement for testing and draining a fire suppression sprinkler system, comprising:
   conduit means for supplying a fire suppression fluid to a plurality of sprinklers;
   means for sensing a flow of said fire suppression fluid in said conduit means;
   a valve having a housing with an inlet and a first outlet, the inlet and the first outlet being provided on opposite ends of the housing with a valve member being provided in the housing between the inlet and the first outlet;
   a valve seal provided between the valve member and said first outlet for sealingly engaging the outer surface of said valve member;
   a valve seat provided between the valve member and the inlet, said valve seat permitting continuous communication between the inlet and the interior of the housing;
   a pressure relief valve having an inlet in communication with the interior of said housing;
   valve actuator means for arranging said valve member (1) to prevent flow between said inlet and said first outlet, (2) to permit a flow from the inlet to the first outlet at a first flow rate for draining said arrangement, and (3) to permit a flow rate from the inlet to the first outlet at a second flow rate which is less than the first flow rate, said second flow rate enabling the means for sensing a flow of said fire suppression fluid in said conduit means to be tested.

17. The arrangement of claim 16, wherein said valve seat is provided with a gap to provide said communication between the inlet and the interior of the housing.

18. The arrangement of claim 17, wherein said pressure relief valve has an outlet in communication with said first outlet of said valve.

19. The arrangement of claim 18, further comprising at least one sight glass provided in said first outlet.

20. The arrangement of claim 16, wherein said second flow rate corresponds to the flow rate through a single open water sprinkler head.

21. The arrangement of claim 16 wherein said valve member is a ball.

22. The arrangement of claim 21 wherein said ball includes a first passageway through said ball which permits said flow at said first flow rate when said first passageway is aligned with said inlet and said first outlet.

23. The arrangement of claim 22 wherein said ball includes a second passageway through said ball which permits said flow at said second flow rate when said second passageway is aligned with said inlet and said first outlet.

24. The arrangement of claim 22 wherein said ball includes a disk provided within said first passageway, said disk having an opening therein which permits a flow corresponding to the second flow rate, said disk being movable between a first position in which said disk is aligned with said first passageway and a second position in which said disk blocks said first passageway except for said opening.

25. The arrangement of claim 22 wherein said ball includes a disk provided within said first passageway, said disk comprising second passageway means for permitting a flow corresponding to the second flow rate.

26. The arrangement of claim 25 wherein said disk is movable between a first position in which said disk is aligned with said first passageway and a second position in which said disk blocks said flow through said first passageway except through said second passageway means.

27. A valve for use in a fire suppression sprinkler system, said valve comprising:
   a housing having an inlet and a first outlet, the inlet and the first outlet being provided on opposite ends of the housing with a valve member being provided in the housing between the inlet and the first outlet;
   a valve seal provided between the valve member and said first outlet for sealingly engaging the outer surface of said valve member;
   a valve seat provided between the valve member and the inlet, said valve seat permitting continuous communication between the inlet and the interior of the housing;

a pressure relief valve having an inlet in communication with the interior of said housing;

valve actuator means for arranging said valve member (1) to prevent flow between said inlet and said first outlet, (2) to permit a flow from the inlet to the first outlet at a first flow rate for draining said arrangement, and (3) to permit a flow rate from the inlet to the first outlet at a second flow rate which is less than the first flow rate, said second flow rate enabling the means for sensing a flow of said fire suppression fluid in said conduit means to be tested. and, means for moving said valve member within said housing.

28. The valve of claim 27, wherein said valve seat is provided with a gap to provide said communication between the inlet and the interior of the housing.

29. The valve of claim 27, wherein said pressure relief valve has an outlet in communication with said first outlet of said valve.

30. The valve of claim 27, further comprising at least one sight glass provided in said first outlet.

31. The valve of claim 27, wherein said second flow rate corresponds to the flow rate through a single open water sprinkler head.

32. The valve of claim 27, wherein said valve member is a ball.

33. The valve of claim 32, wherein said valve seat is provided with a gap to provide said communication between the inlet and the interior of the housing.

34. The valve of claim 33, wherein said pressure relief valve has an outlet in communication with said first outlet of said valve.

35. The valve of claim 34, further comprising at least one sight glass provided in said first outlet.

36. The valve of claim 34, wherein said second flow rate corresponds to the flow rate through a single open water sprinkler head.

37. The valve of claim 32 wherein said ball includes a first passageway through said ball which permits said flow at said first flow rate when said first passageway is aligned with said inlet and said first outlet.

38. The valve of claim 37 wherein said ball includes a second passageway through said ball which permits said flow at said second flow rate when said second passageway is aligned with said inlet and said first outlet.

39. The valve of claim 37 wherein said ball includes a disk provided within said first passageway, said disk having an opening therein which permits a flow corresponding to the second flow rate, said disk being movable between a first position in which said disk is aligned with said first passageway and a second position in which said disk blocks said first passageway except for said opening.

40. The valve of claim 37 wherein said ball includes a disk provided within said first passageway, said disk comprising second passageway means for permitting a flow corresponding to the second flow rate.

41. The valve of claim 40 wherein said disk is movable between a first position in which said disk is aligned with said first passageway and a second position in which said disk blocks said flow through said first passageway except through said second passageway means.

42. A valve, comprising:

a housing having an inlet and a first outlet, the inlet and the first outlet being provided on opposite ends of the housing with a valve member being provided in the housing between the inlet and the outlet;

valve actuator means for arranging said valve member (1) to prevent flow between said inlet and said first outlet, (2) to permit a flow from the inlet to the first outlet at a first flow rate, and (3) to permit a flow rate from the inlet to the first outlet at a second flow rate which is less than the first flow rate, said valve member including a first passageway through said valve member which permits said flow at said first flow rate when said first passageway is aligned with said inlet and said outlet, said valve member including a disk provided within said first passageway, said disk comprising second passageway means for permitting a flow corresponding to the second flow rate; and, means for moving said valve member within said housing.

43. The valve of claim 42 wherein said valve member is a ball.

44. The valve of claim 43 wherein said disk is movable between a first position in which said disk is aligned with said first passageway and a second position in which said disk blocks said flow through said first passageway except through said second passageway means.

45. The valve of claim 44 wherein said means for permitting a flow corresponding to the second flow rate comprises an opening in said disk, said disk being movable between a first position in which said disk is aligned with said first passageway and a second position in which said disk blocks said first passageway except for said opening.

* * * * *